(12) United States Patent
Mochizuki

(10) Patent No.: US 9,302,731 B2
(45) Date of Patent: Apr. 5, 2016

(54) VEHICLE HEIGHT ADJUSTMENT DEVICE

(71) Applicant: KAYABA INDUSTRY CO., LTD., Tokyo (JP)

(72) Inventor: Takahisa Mochizuki, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/408,970

(22) PCT Filed: Mar. 12, 2014

(86) PCT No.: PCT/JP2014/056458
§ 371 (c)(1),
(2) Date: Dec. 18, 2014

(87) PCT Pub. No.: WO2014/142160
PCT Pub. Date: Sep. 18, 2014

(65) Prior Publication Data
US 2016/0023711 A1 Jan. 28, 2016

(30) Foreign Application Priority Data
Mar. 14, 2013 (JP) ................................. 2013-051844

(51) Int. Cl.
*B60G 17/04* (2006.01)
*B62K 25/20* (2006.01)
*B62K 25/04* (2006.01)
*B60G 17/027* (2006.01)

(52) U.S. Cl.
CPC ............ *B62K 25/20* (2013.01); *B60G 17/0272* (2013.01); *B62K 25/04* (2013.01); *B60G 2202/413* (2013.01); *B60G 2204/1242* (2013.01); *B60G 2300/12* (2013.01); *B60G 2500/30* (2013.01); *B62K 2025/045* (2013.01)

(58) Field of Classification Search
USPC .................... 280/5.514, 6.153, 6.154, 6.157, 280/124.157, 124.159, 124.16
See application file for complete search history.

(56) References Cited

U.S. PATENT DOCUMENTS 4,593,931 A * 6/1986 Shiratori ................ B60G 17/04
180/41
4,852,905 A * 8/1989 Tanaka ............... B60G 17/0162
280/124.106

(Continued)

FOREIGN PATENT DOCUMENTS

JP 02-081786 A 3/1990
JP 07-164853 A 6/1995

(Continued)

*Primary Examiner* — Toan To
(74) *Attorney, Agent, or Firm* — Rabin & Berdo, P.C.

(57) ABSTRACT

A vehicle height adjustment device includes a jack chamber for supporting a spring receiver supporting a suspension spring's one-side end portion and a fluid-pressure driving unit for supplying/discharging an operating fluid into/out of the jack chamber and elevating up/down the spring receiver. The fluid-pressure driving unit includes a pump for selectively supplying the operating fluid to a first or second channel and a tank connected to the first or second channel not receiving an operating fluid's supply from the pump. The vehicle height adjustment device further includes a jack channel allowing the first channel and the jack chamber to communicate with each other, a valve body closing the jack channel, capable of opening/closing, a spring for urging the valve body in a direction for shutting off the jack channel, and a pilot line for having a second channel's pressure act on the valve body so the jack channel is opened.

4 Claims, 3 Drawing Sheets

(56) References Cited

U.S. PATENT DOCUMENTS

| | | | | |
|---|---|---|---|---|
| 4,953,890 A | * | 9/1990 | Kamimura | B60G 17/0162 280/124.106 |
| 4,967,360 A | * | 10/1990 | Fukunaga | B60G 17/017 280/5.514 |
| 4,973,080 A | * | 11/1990 | Ikemoto | B60G 17/017 280/124.159 |
| 5,037,119 A | * | 8/1991 | Takehara | B60G 17/0163 180/415 |
| 5,080,391 A | * | 1/1992 | Kawabata | B60G 17/016 280/5.507 |
| 5,865,453 A | | 2/1999 | Harada et al. | |
| 6,168,171 B1 | * | 1/2001 | Shono | B60G 17/005 280/5.507 |
| 6,196,555 B1 | * | 3/2001 | Gaibler | B60G 17/005 280/124.161 |
| 6,282,470 B1 | * | 8/2001 | Shono | B60G 17/015 180/41 |
| 2003/0015846 A1 | * | 1/2003 | Rogala | B60G 13/14 280/5.514 |
| 2009/0062985 A1 | * | 3/2009 | Ohashi | B60G 17/04 701/37 |
| 2013/0249175 A1 | * | 9/2013 | Ellifson | B60G 17/056 280/6.157 |

FOREIGN PATENT DOCUMENTS

| | | |
|---|---|---|
| JP | 9-323523 A | 12/1997 |
| JP | 2003-172307 A | 6/2003 |
| JP | 2008-267575 A | 11/2008 |
| JP | 2009-078721 A | 4/2009 |
| JP | 2010-149550 A | 7/2010 |

* cited by examiner

VEHICLE HEIGHT ADJUSTMENT DEVICE

TECHNICAL FIELD

The present invention relates to a vehicle height adjustment device.

BACKGROUND ART

In general, a coil spring or an air spring called a suspension spring elastically supporting a vehicle body is interposed between a vehicle body and a wheel in a vehicle. The suspension spring absorbs an impact caused by irregularity on a road surface.

In a vehicle, if there are many loads or occupants, a compression amount of the suspension spring becomes larger. As a result, a vehicle height might become too low. On the other hand, if the loads or occupants are fewer, the compression amount of the suspension spring becomes smaller. As a result, the vehicle height might become too high. Thus, as disclosed in JP2010-149550A, a vehicle height adjustment device for adjusting a vehicle height is mounted on a vehicle in some cases. In the vehicle height adjustment device, a jack chamber filled with an operating fluid supports a spring receiver supporting a one-side end portion of the suspension spring. Then, by supplying/discharging the operating fluid into/out of this jack chamber by a pump, the spring receiver is elevated up/down so as to adjust the vehicle height.

SUMMARY OF INVENTION

In the above-described vehicle height adjustment device, it is preferable that the vehicle height is lowered quickly when the vehicle is stopped so that a foot reaching performance in which a foot can reach the ground easily is made favorable in some cases. Those cases are such that the above-described vehicle height adjustment device is used for a rear suspension of a bicycle, for example. However, with the pump of the vehicle height adjustment device described in JP2010-149550A, a motor drives a piston (a piston 11 in JP2010-149550A). Then, by using a reciprocating motion of this piston, the operating fluid is supplied/discharged into/out of the jack chamber. Thus, the vehicle height is not lowered until the piston is driven by the motor in a retreating direction. As a result, it is difficult to quickly lower the vehicle height when the vehicle is stopped so as to make the foot reaching performance favorable.

The present invention has an object to provide a vehicle height adjustment device which can quickly lower a vehicle height and make the foot reaching performance when the vehicle is stopped favorable.

A vehicle height adjustment device in an aspect of the present invention is a vehicle height adjustment device mounted on a vehicle and adapted to adjust a vehicle height includes a suspension spring adapted to elastically support a vehicle body, a spring receiver adapted to support a one-side end portion of the suspension spring, a jack chamber filled with an operating fluid and adapted to support the spring receiver and a fluid-pressure driving unit adapted to supply and discharge the operating fluid into and out of the jack chamber and to elevate up and down the spring receiver, in which the fluid-pressure driving unit includes a first channel and a second channel a pump adapted to selectively supply the operating fluid to the first channel or the second channel and a tank connected to the first channel or the second channel not receiving a supply of the operating fluid from the pump, and the vehicle height adjustment device further includes a jack channel adapted to allow the first channel and the jack chamber to communicate with each other, a valve body adapted to close the jack channel, capable of opening and closing, a spring adapted to urge the valve body in a direction for shutting off the jack channel, and a pilot line adapted to have a pressure of the second channel act on the valve body so that the jack channel is opened.

DESCRIPTION OF EMBODIMENTS

Figure 1:
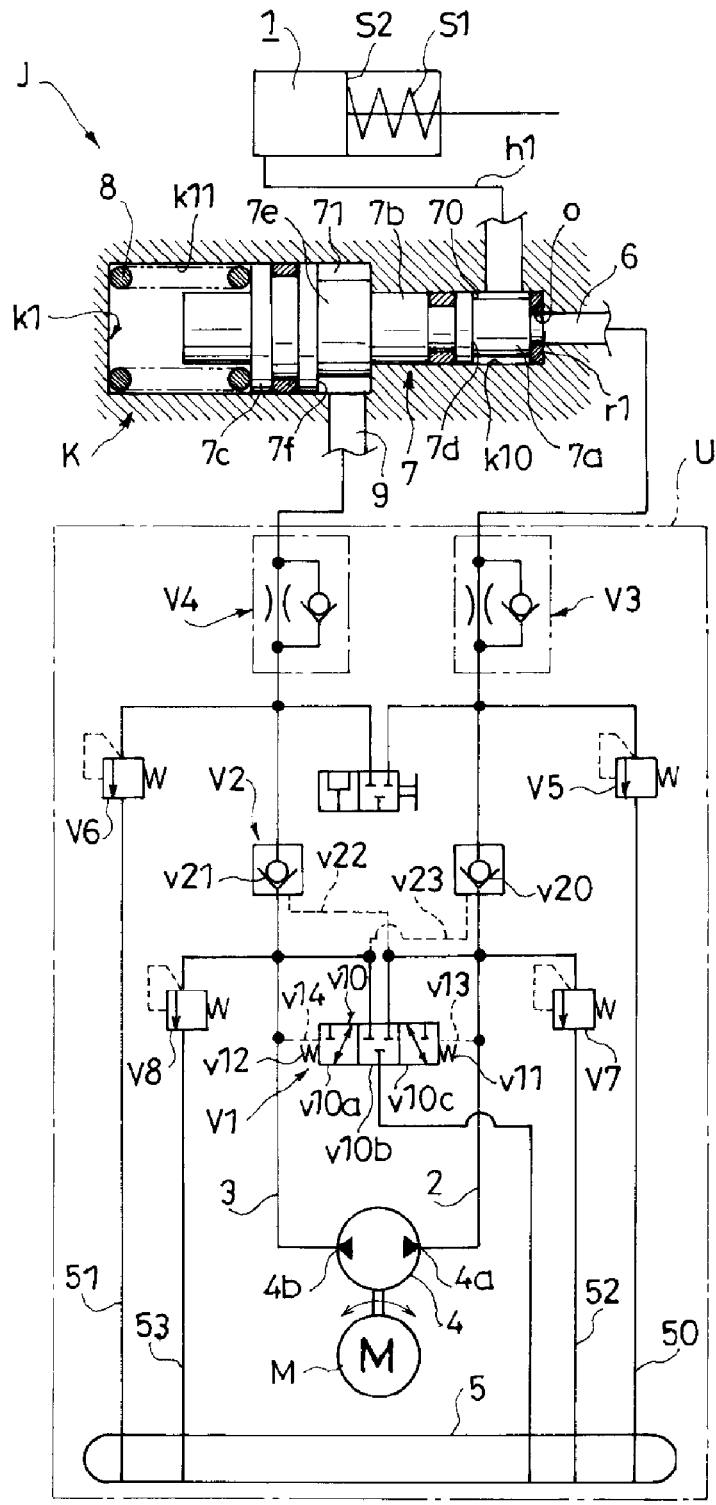
FIG. 1 is an outline diagram of a vehicle height adjustment device according to an embodiment of the present invention.

An embodiment of the present invention will be explained below by referring to the attached drawings. The same reference numerals given throughout several drawings indicate the same or corresponding components.

As illustrated in FIG. 1, a vehicle height adjustment device J according to this embodiment includes a suspension spring S1 for elastically supporting a vehicle body, a spring receiver S2 for supporting a one-side end portion of the suspension spring S1, a jack chamber 1 filled with an operating fluid and for supporting the spring receiver S2, and a fluid-pressure driving unit U for supplying/discharging the operating fluid into/out of the jack chamber 1 and elevating up/down the spring receiver S2. The fluid-pressure driving unit U includes a first channel 2, a second channel 3, a pump 4 for selectively supplying/discharging the operating fluid into/out of the first channel 2 or the second channel 3, and a tank 5 connected to the first channel 2 or the second channel 3 not receiving the supply of the operating fluid from the pump 4.

The vehicle height adjustment device J further includes a jack channel 6 allowing the first channel 2 and the jack chamber 1 to communicate with each other, a valve body 7 closing the jack channel 6, capable of opening/closing, a spring 8 for urging the valve body 7 in a direction for shutting off the jack channel 6, and a pilot line 9 for having a pressure of the second channel 3 act on the valve body 7 so that the jack channel 6 is opened.

Figure 2:
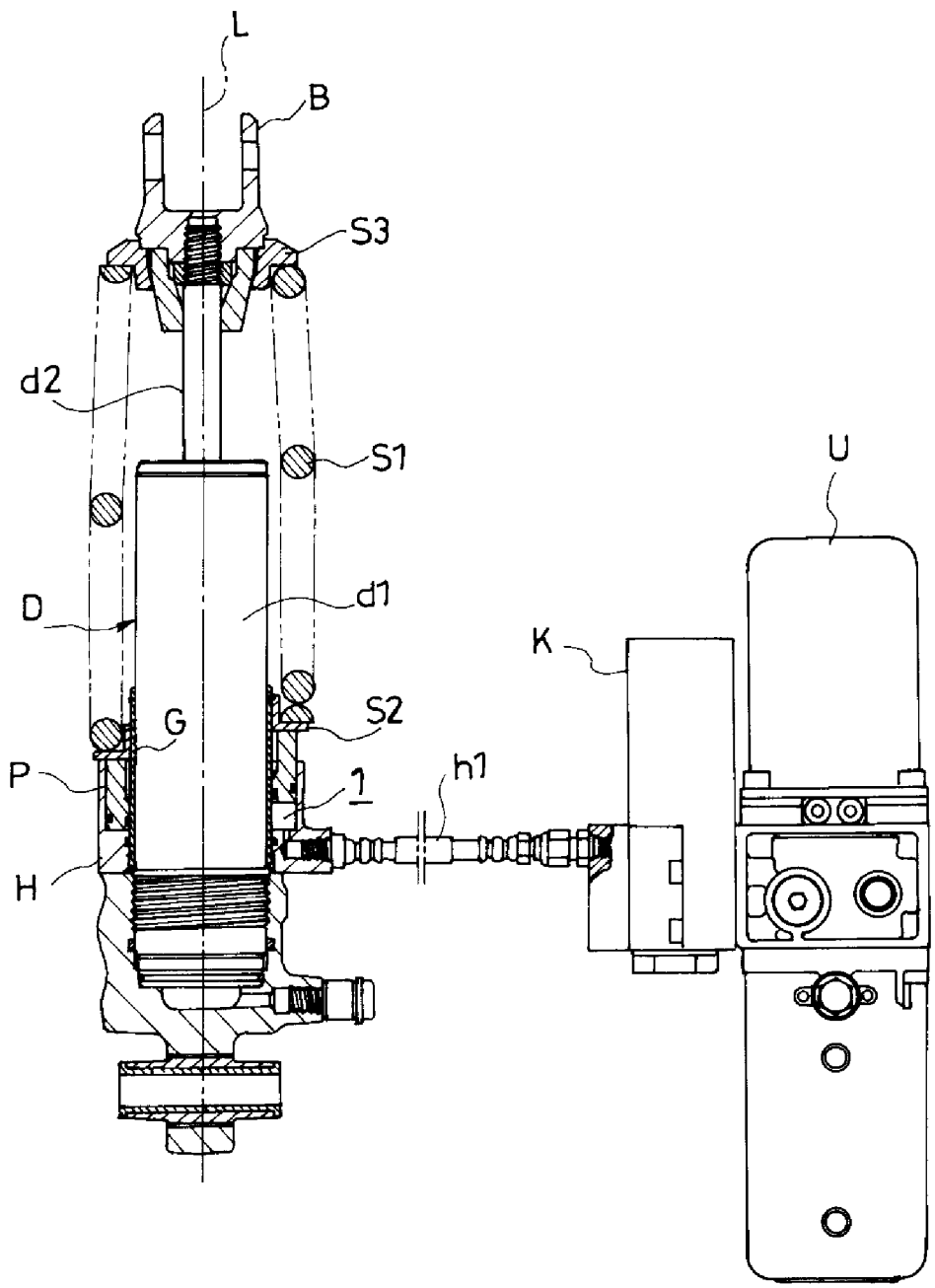
FIG. 2 is a diagram illustrating a mounted state of the vehicle height adjustment device according to the embodiment of the present invention.

Explaining below in detail, as illustrated in FIG. 2, in this embodiment, the suspension spring S1 constitutes a rear suspension for suspending a rear wheel of a bicycle together with a shock absorber D. The shock absorber D includes an outer tube d1 and a piston rod d2 going into/out of the outer tube d1. The shock absorber D generates a damping force suppressing relative movement of the other with respect to one of the outer tube d1 and the piston rod d2.

The suspension spring S1 is interposed between a pair of spring receivers S2 and S3. The one spring receiver S2 supports a lower end portion in FIG. 2 of the suspension spring S1. The spring receiver S2 is mounted on an outer periphery of the outer tube d1 connected to either one of a vehicle body side or a wheel side, movably in an axial direction. The other spring receiver S3 supports an upper end portion in FIG. 2 of the suspension spring S1. The spring receiver S3 is fixed to a bracket B connecting the piston rod d2 to the other of the vehicle body side or the wheel side. The suspension spring S1 is compressed in advance and is interposed between the spring receivers S2 and S3. Thus, a reaction force of the suspension spring S1 acts on the both spring receivers S2 and S3 at all times.

When an external force is inputted from the wheel side, with respect to one of the outer tube d1 and the piston rod d2, the other relatively moves in the axial direction, and the shock absorber D and the suspension spring S1 compress. As a result, the rear suspension absorbs an impact caused by irregularity on a road surface by the suspension spring S1, and an extension/contraction motion of the suspension spring S1 involved with this impact absorption is suppressed by the shock absorber D. As a result, transmission of the impact to the vehicle body can be prevented.

The spring receiver S2 is formed in an annular shape. The spring receiver S2 is in sliding contact with an outer peripheral surface of a guide cylinder G. The guide cylinder G is mounted on the outer periphery of the outer tube d1. A housing H having a cylindrical shape with a bottom is fixed to an outer periphery of the guide cylinder G and on a lower side in FIG. 2 of the spring receiver S2. The housing H forms an annular jack chamber 1 between the guide cylinder G and itself. An upper opening in FIG. 2 of the jack chamber 1 is in sliding contact with an outer peripheral surface of the guide cylinder G. The upper opening is closed by a jack piston P. The jack piston P is in contact with a lower surface in FIG. 2 of the spring receiver S2. The jack piston P supports the spring receiver S2 by an operating fluid made of a non-compressive liquid filled in the jack chamber 1. The operating fluid is an operating oil and the like.

The fluid-pressure driving unit U supplies/discharges an operating fluid into/out of the jack chamber 1. The fluid-pressure driving unit U elevates up/down the spring receiver S2 in this embodiment. On the right side of a center line L in FIG. 2, a state in which the spring receiver s2 is raised to the maximum is illustrated. On the left side of the center line L in FIG. 2, a state in which the spring receiver S2 is lowered to the maximum is illustrated. The jack channel 6 connected to the first channel 2 and the pilot line 9 connected to the second channel 3 are formed in a case K externally mounted on the fluid-pressure driving unit U in this embodiment. The jack channel 6 is made to communicate with the jack chamber 1 through a hose h1. The valve body 7 and the spring 8 are accommodated in the case K.

The fluid-pressure driving unit U can selectively supply the operating fluid to the first channel 2 or the second channel 3 by the pump 4. The fluid-pressure driving unit U may be provided with any configuration as long as the first channel 2 or the second channel 3 not receiving the supply of the operating fluid from the pump 4 can be connected to the tank 5. In this embodiment, a configuration described in FIG. 3 which will be described later is employed as it is for the fluid-pressure driving unit U. Specifically, as illustrated in FIG. 1, the pump 4 is driven by a forward/backward rotation motor M and discharges the operating fluid to both directions. To one discharge port 4a of the pump 4, the first channel 2 continues, while to the other discharge port 4b of the pump 4, the second channel 3 continues. The fluid-pressure driving unit U is provided with a switching valve V1 for connecting the first channel 2 or the second channel 3 not receiving the supply of the operating fluid from the pump 4 to the tank 5.

The switching valve V1 includes a valve body v10, a pair of springs v11 and v12, a first pilot line v13, and a second pilot line v14. The valve body v10 includes a first communication position v10a, a shut-off position v10b, and a second communication position v10c. The first communication position v10a allows the first channel 2 and the tank 5 to communicate with each other. The shut-off position v10b shuts off the communication between both the first channel 2 and the second channel 3 and the tank 5. The second communication position v10c allows the second channel 3 and the tank 5 to communicate with each other. The pair of springs v11 and v12 is arranged on both sides of the valve body v10 and positions the valve body v10 at the shut-off position v10b. The first pilot line v13 has a pressure of the first channel 2 act so that the valve body v10 takes the second communication position v10c. The second pilot line v14 has the pressure of the second channel 3 act so that the valve body v10 takes the first communication position v10a.

On a side closer to the case K than the switching valve V1 in the fluid-pressure driving unit U, an operate check valve V2 is provided. The operate check valve V2 includes a first check valve v20, a second check valve v21, a first pilot line v22, and a second pilot line v23. The first check valve v20 is provided in the middle of the first channel 2 and allows a flow of the operating fluid flowing from a side of the pump 4 toward the side of the case K but prevents the flow in the opposite direction. The second check valve v21 is provided in the middle of the second channel 3 and allows a flow of the operating fluid from the pump 4 side toward the case K side but prevents the flow in the opposite direction. The first pilot line v22 has the pressure of the first channel 2 act so that the second check valve v21 is opened. The second pilot line v23 has the pressure of the second channel 3 act so that the first check valve v20 is opened.

Thus, when the pump 4 is driven and the operating fluid discharged from the pump 4 is supplied to the first channel 2, the first check valve v20 allows only the flow of the operating fluid moving through the first channel 2 and flowing from the pump 4 side toward the case K side and prevents the flow in the opposite direction. Moreover, the second check valve v21 opens the second channel 3 and allows the flows in the both directions. When the pump 4 is driven and the operating fluid discharged from the pump 4 is supplied to the second channel 3, the second check valve v21 allows only the flow of the operating fluid moving through the second channel 3 and flowing from the pump 4 side toward the case K side and prevents the flow in the opposite direction. Moreover, the first check valve v20 opens the first channel 2 and allows the flows in the both directions. When the pump 4 is not driven, the both check valves v20 and v21 allow only the flow of the operating fluid passing through the first channel 2 and the second channel 3 and flowing from the pump 4 side toward the case K side and prevent the flow in the opposite direction.

In the first channel 2 and the second channel 3 closer to the case K side than the operate check valve V2 in the fluid-pressure driving unit U, slow return valves V3 and V4 are provided. Only when the operating fluid flows toward the operate check valve V2 side, the slow return valves V3 and V4 narrow the flow. Moreover, in the first channel 2 and the second channel 3, relief channels 50, 51, 52, and 53 connected to the tank 5 extend between the operate check valve V2 and the slow return valves V3 and V4 and between the operate check valve V2 and the switching valve V1, respectively. In the relief channels 50, 51, 52, and 53, relief valves V5, V6, V7, and V8 for relieving an excessive operating fluid to the tank 5 are provided, respectively, when an abnormal pressure rise occurs in the first channel 2 or the second channel 3.

In the case K, a chamber k1 accommodating the valve body 7 and the spring 8 is formed. The chamber k1 includes a small diameter chamber k10 and a large diameter chamber k11 continuing coaxially to the small diameter chamber k10 and having a diameter larger than that of the small diameter chamber k10. The small diameter chamber k10 continues to the middle of the jack channel 6 provided between the first channel 2 and the hose h1. The large diameter chamber k11 continues to a terminal of the pilot line 9 connected to the second channel 3.

The valve body 7 includes a head portion 7a, a first piston portion 7b and a second piston portion 7c. The head portion 7a closes a first channel side opening "o" of the small diameter chamber k10, capable of opening/closing. The first piston portion 7b defines a first chamber 70 in sliding contact with an inner peripheral surface of the case K and communicating with the jack chamber 1 at all times in the small diameter chamber k10. The second piston portion 7c defines a second chamber 71 in sliding contact with the inner peripheral surface of the case K and communicating with the second channel 3 through the pilot line 9 at all times in the large diameter chamber k11. On a side opposite to the head portion from the second piston portion 7c in the large diameter chamber k11, the spring 8 is accommodated. In other words, the spring 8 is accommodated in a portion on the side opposite to the head portion 7a when seen from the second piston portion 7c in the large diameter chamber k11. The spring 8 urges the valve body 7 toward the right side in FIG. 1, that is, in a direction for shutting off the jack channel 6.

The first channel side opening "o" is arranged facing the head portion 7a and holds an annular seal r1. The head portion 7a is brought into contact with the seal r1 so as to close the first channel side opening "o". As a result, the jack channel 6 is shut off. On the head portion 7a, the pressure of the first channel 2 acts in a direction for pushing down the valve body 7 against the urging force of the spring 8. Thus, when the pressure of the first channel 2 becomes a predetermined pressure or more, the head portion 7a leaves the seal r1, and the jack channel 6 is relieved. The seal r1 may be mounted on the valve body 7.

A diameter of the head portion 7a is formed smaller than the diameter of the small diameter chamber k10. An opening (without reference numeral) on the jack chamber side of the small diameter chamber k10 is opened toward a side surface of the head portion 7a. Thus, the pressure of the first chamber 70 formed on an outer periphery of the head portion 7a becomes equal to the pressure of the jack chamber 1 at all times. On a stepped surface 7d between the first piston portion 7b and the head portion 7a, a pressure of the jack chamber 1 acts in a direction for pushing down the valve body 7 against the urging force of the spring 8. Thus, when the pressure of the jack chamber 1 becomes a predetermined pressure or more, the head portion 7a leaves the seal r1, and the jack channel 6 is relieved.

Between the first piston portion 7b and the second piston portion 7c, a stopper portion 7e for regulating movement of the valve body 7 to the right side in FIG. 1 is provided. A diameter of the stopper portion 7e is formed smaller than the diameter of the large diameter chamber k11. An opening (without reference numeral) of the large diameter chamber k11 continuing to the pilot line 9 is opened toward a side surface of the stopper portion 7e. Thus, a pressure of the second chamber 71 formed on an outer periphery of the stopper portion 7e becomes equal to the pressure of the second channel 3 at all times. On a stepped surface 7f between the second piston portion 7c and the stopper portion 7e, the pressure of the second channel 3 acts in a direction for pushing down the valve body 7 against the urging force of the spring 8 through the pilot line 9. Thus, when the pressure of the second channel 3 becomes a predetermined pressure or more, the head portion 7a leaves the seal r1, and the jack channel 6 is relieved.

Subsequently, an operation of the vehicle height adjustment device J according to this embodiment will be explained.

When the motor M is rotated forward and the operating fluid is supplied from the pump 4 to the first channel 2, the switching valve V1 takes the second communication position v10c against the urging force of the spring v12. Moreover, the second check valve v21 receives the pressure of the first channel 2 and is opened. The second check valve v21 allows the operating fluid to move in the both directions in the second channel 3. The operating fluid discharged from the pump 4 to the first channel 2 opens the first check valve v20 and the slow return valve V3 and flows into the jack channel 6. The operating fluid having flowed into the jack channel 6 pushes down the valve body 7 against the urging force of the spring 8 and relieves the jack channel 6. The operating fluid having relieved the jack channel 6 passes through the first chamber 70 and the hose h1 and is supplied to the jack chamber 1. Thus, the jack piston P and the spring receiver S2 are pushed up, and the vehicle height is raised. To the pump 4 and the second chamber 71, the operating fluid is supplied from the tank 5 through the second channel 3.

When the motor M is rotated backward and the operating fluid is supplied from the pump 4 to the second channel 3, the switching valve V1 takes the first communication position v10a against the urging force of the spring v11. Moreover, the first check valve v20 receives the pressure of the second channel 3 and is opened. The first check valve v20 allows the operating fluid to move in the both directions in the first channel 2. The operating fluid discharged from the pump 4 to the second channel 3 opens the second check valve v21 and the slow return valve V4, passes through the pilot line 9 and flows into the second chamber 71. The operating fluid having flowed into the second chamber 71 pushes down the valve body 7 against the urging force of the spring 8 and relieves the jack channel 6. At this time, the first channel 2 continuing to the jack channel 6 has a tank pressure. Thus, the spring receiver S2 and the jack piston P are pushed down by the reaction force of the suspension spring S1, and the vehicle height is lowered. At this time, the operating fluid of the jack chamber 1 passes through the jack channel 6 and flows out to the first channel 2. To the pump 4, the operating fluid is supplied from the tank 5 and the jack chamber 1 through the first channel 2.

Even when the motor M is not driven, if the jack chamber 1 is pressurized and the pressure of the first chamber 70 becomes high, and if a thrust caused by this pressure exceeds the urging force of the spring 8, the valve body 7 is pushed down against the urging force of the spring 8, and the jack channel 6 is relieved. At this time, since the first check valve v20 is not opened, when the pressure of the first channel 2 closer to the case K side than the first check valve v20 becomes a predetermined pressure or more, the relief valve V5 is opened, and the operating fluid flows out to the tank 5. As described above, if the pressure of the jack chamber 1 is made to act on the valve body 7 so that the jack channel 6 is opened, the operating fluid is supplied to the second chamber 71 enlarging with retreat of the valve body 7. For that purpose, though not shown, it is preferable that the tank 5 and the second channel 3 are made to communicate with each other, and a supply channel which allows only a flow of the operating fluid moving from the tank 5 to the second channel 3 is provided.

Subsequently, a working effect of the vehicle height adjustment device J according to this embodiment will be explained. The vehicle height adjustment device J includes the suspension spring S1 for elastically supporting the vehicle body, the spring receiver S2 for supporting a one-side end portion of the suspension spring S1, the jack chamber 1 filled with the operating fluid and supporting the spring receiver S2, and the fluid-pressure driving unit U for supplying/discharging the operating fluid into/out of the jack chamber 1 and elevating up/down the spring receiver S2. The fluid-pressure driving unit U includes the first channel 2, the second channel 3, the pump 4 for selectively supplying the operating fluid to the first channel 2 or the second channel 3, and the tank 5 connected to the first channel 2 or the second channel 3 not receiving the supply of the operating fluid from the pump 4.

The vehicle height adjustment device J further includes the jack channel 6 allowing the first channel 2 and the jack chamber 1 to communicate with each other, the valve body 7 closing the jack channel 6, capable of opening/closing, the spring 8 for urging the valve body 7 in the direction for shutting off the jack channel 6, and the pilot line 9 for having the pressure of the second channel 3 act on the valve body 7 so that the jack channel 6 is opened.

According to the above-described configuration, by supplying the operating fluid to the second channel 3 by the pump 4 and by connecting the first channel 2 to the tank 5, the pressure of the second channel 3 can be made to act on the valve body 7, and the jack channel 6 can be opened. Thus, the operating fluid of the jack chamber 1 can be made to flow out to the first channel 2 which becomes a tank pressure by using a reaction force of the suspension spring S1. As a result, the vehicle height can be quickly lowered, and the foot reaching performance when the vehicle is stopped can be made favorable.

The vehicle height adjustment device J according to this embodiment is configured such that the pressure of the jack chamber 1 acts on the valve body 7 so that the jack channel 6 is opened.

According to the above-described configuration, even when the pump 4 is not driven, when the pressure of the jack chamber 1 becomes a predetermined pressure or more, the valve body 7 opens the jack channel 6 against the urging force of the spring 8. Thus, the pressure of the jack chamber 1 can be prevented from becoming excessive, and the vehicle height adjustment device J can be protected.

The vehicle height adjustment device J according to this embodiment is further provided with the case K externally mounted on the fluid-pressure driving unit U. In the case K, the jack channel 6 and the pilot line 9 are formed, and the chamber k1 for accommodating the valve body 7 therein is formed.

According to the above-described configuration, the fluid-pressure driving unit U for driving the cylinder device can be used for vehicle height adjustment only by separately attaching the case K if the fluid-pressure driving unit U for driving the cylinder device is provided. The fluid-pressure driving unit U as the one for driving the cylinder device will be described later.

In the vehicle height adjustment device J according to this embodiment, the chamber k1 includes the small diameter chamber k10 and the large diameter chamber k11 continuing to the small diameter chamber k10 and having the diameter larger than that of the small diameter chamber k10, and the small diameter chamber k10 continues to the middle of the jack channel 6 and the large diameter chamber k11 continues to the terminal of the pilot line 9. Moreover, the valve body 7 includes the head portion 7a closing the first channel side opening "o" of the small diameter chamber k10, capable of opening/closing, the first piston portion 7b defining the first chamber 70 in sliding contact with the inner peripheral surface of the case K and communicating with the jack chamber 1 at all times in the small diameter chamber k10, and the second piston portion 7c defining the second chamber 71 in sliding contact with the inner peripheral surface of the case K and communicating with the second channel 3 at all times in the large diameter chamber k11. The spring 8 is accommodated on the side opposite to the head portion from the second piston portion 7c in the large diameter chamber k11.

According to the above-described configuration, since the pressure of the second chamber 71 is made the pressure of the second channel 3, the pressure of the second channel 3 can be easily made to act on the second piston portion 7c in a direction so that the jack channel 6 is opened. Moreover, according to the above-described configuration, since the pressure of the first chamber 70 is made the pressure of the jack chamber 1, the pressure of the jack chamber 1 can be easily made to act on the first piston portion 7b in a direction so that the jack channel 6 is opened.

Figure 3:
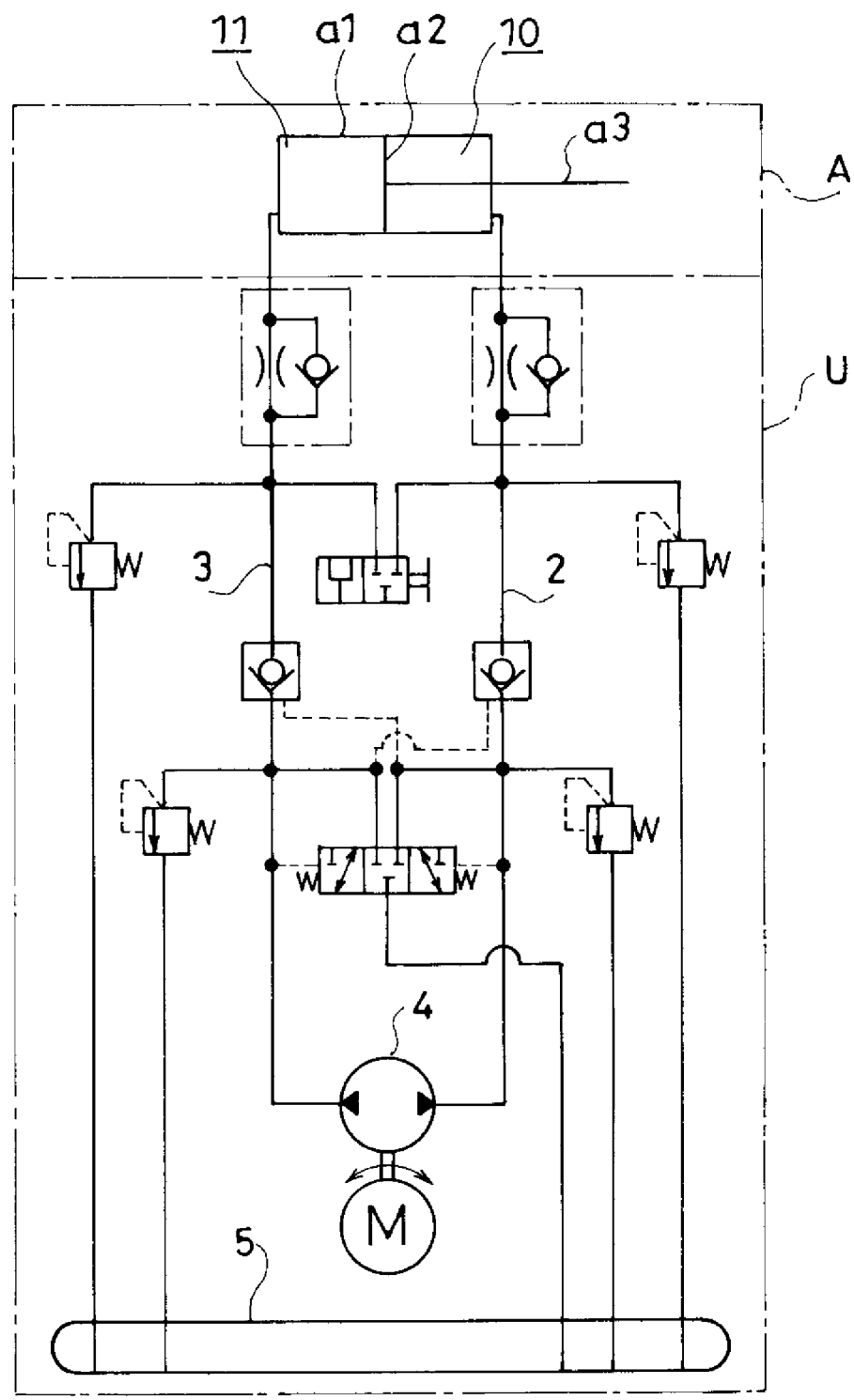
FIG. 3 is an outline diagram illustrating a state in which a fluid-pressure driving unit is connected to a cylinder device.

Here, FIG. 3 illustrates a hydraulic circuit when the fluid-pressure driving unit U is used for driving of a cylinder device A. The fluid-pressure driving unit U is connected to the cylinder device A. The fluid pressure driving unit U drives a target by extending/contracting the cylinder device A. The cylinder device A includes a cylinder a1, a piston a2 movably inserted into the cylinder a1, a first chamber 10 and a second chamber 11 divided by the piston a2 in the cylinder a1, and a rod a3 connected to the piston a2 and extending to an outside of the cylinder a1. In this example, the first channel 2 communicates with the first chamber 10, and the second channel 3 communicates with the second chamber 11.

The fluid-pressure driving unit U supplies the operating fluid from the pump 4 to the first chamber 10 through the first channel 2 and allows the operating fluid in the second chamber 11 to flow out to the second channel 3 which becomes the tank pressure so as to contract the cylinder device A. Moreover, the operating fluid is supplied from the pump 4 to the second chamber 11 through the second channel 3 and allows the operating fluid in the first camber 10 to flow out to the first channel 2 which becomes the tank pressure so as to extend the cylinder device A. The similar example is disclosed in JP2003-172307A and JP2008-267575A.

If such fluid-pressure driving unit U is applied to the vehicle height adjustment device, a chamber for supplying/discharging the operating fluid in the vehicle height adjustment device is only the jack chamber. Thus, if this fluid-pressure driving unit U is to be used as it is for the vehicle height adjustment device, either one of the first channel 2 and the second channel 3 receiving the supply of the operating fluid from the pump 4 becomes unnecessary. As a result, the first channel 2 and the second channel 3 cannot be sufficiently utilized. The similar example is disclosed in FIG. 2 of JP2008-267575A.

In the vehicle height adjustment device J according to this embodiment, even if the fluid-pressure driving unit U for driving a cylinder device illustrated in FIG. 3 is used as it is, since it is provided with the jack channel 6 connected to the first channel 2 and the pilot line 9 connected to the second channel 3, the operating fluid can be supplied/discharged into/out of the jack chamber 1 by using both the first channel 2 and the second channel 3.

The embodiment of the present invention is explained as above, but the above-described embodiment illustrates only a part of an application example of the present invention and is not intended to limit the technical scope of the present invention to the specific configuration of the above-described embodiment.

For example, in the above-described embodiment, the vehicle height adjustment device J is used for a rear suspension for suspending a rear wheel of a bicycle but may be used for other vehicles.

In the above-described embodiment, the case K externally mounted on the fluid-pressure driving unit U is provided, and the jack channel 6 and the pilot line 9 are formed in the case K, and the valve body 7 and the spring 8 are accommodated therein, but the jack channel 6 and the pilot line 9 may be formed in the fluid-pressure driving unit U, and the valve body 7 and the spring 8 may be accommodated.

The shapes and the configurations of the chamber k1 and the valve body 7 are not limited to those in the above, and the shapes and the configurations can be selected as appropriate at least as long as the pressure of the second channel 3 can be made to act so that the valve body 7 closing the jack channel 6, capable of opening/closing, opens the jack channel 6.

The present application claims for priority based on Japanese Patent Application No. 2013-051844 filed with Japan Patent Office on Mar. 14, 2013, and all the contents of this application are incorporated in this description by reference.

The invention claimed is:

1. A vehicle height adjustment device mounted on a vehicle and adapted to adjust a vehicle height, comprising:
   a suspension spring adapted to elastically support a vehicle body;
   a spring receiver adapted to support a one-side end portion of the suspension spring;
   a jack chamber filled with an operating fluid and adapted to support the spring receiver; and
   a fluid-pressure driving unit adapted to supply and discharge the operating fluid into and out of the jack chamber and to elevate up and down the spring receiver, wherein
   the fluid-pressure driving unit includes:
      a first channel and a second channel;
      a pump adapted to selectively supply the operating fluid to the first channel or the second channel; and
      a tank connected to the first channel or the second channel not receiving a supply of the operating fluid from the pump; and
   the vehicle height adjustment device further includes:
      a jack channel adapted to allow the first channel and the jack chamber to communicate with each other;
      a valve body adapted to close the jack channel, capable of opening and closing;
      a spring adapted to urge the valve body in a direction for shutting off the jack channel; and
      a pilot line adapted to have a pressure of the second channel act on the valve body so that the jack channel is opened.

2. The vehicle height adjustment device according to claim 1, wherein
   on the valve body, a pressure of the jack chamber acts so that the jack channel is opened.

3. The vehicle height adjustment device according to claim 1, further comprising:
   a case externally mounted on the fluid-pressure driving unit; and
   in the case, the jack channel and the pilot line are formed, and a chamber adapted to accommodate the valve body therein is formed.

4. The vehicle height adjustment device according to claim 3, wherein
   the chamber includes a small diameter chamber and a large diameter chamber adapted to continue to the small diameter chamber and to have a diameter larger than a diameter of the small diameter chamber;
   the small diameter chamber continues to a middle of the jack channel and the large diameter chamber continues to a terminal of the pilot line;
   the valve body includes a head portion adapted to close a first channel side opening of the small diameter chamber, capable of opening and closing, a first piston portion defining a first chamber in sliding contact with an inner peripheral surface of the case and communicating with the jack chamber at all times in the small diameter chamber, and a second piston portion defining a second chamber in sliding contact with the inner peripheral surface of the case and communicating with the second channel at all times in the large diameter chamber; and
   the spring is accommodated on a side opposite to the head portion from the second piston portion in the large diameter chamber.

\* \* \* \* \*